United States Patent
Wu et al.

(10) Patent No.: US 7,593,433 B1
(45) Date of Patent: *Sep. 22, 2009

(54) SYSTEM AND METHOD FOR MULTIPLE CHANNEL STATISTICAL RE-MULTIPLEXING

(75) Inventors: Fang Wu, San Jose, CA (US); Sangeeta Ramakrishnan, San Jose, CA (US); Ji Zhang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 794 days.

This patent is subject to a terminal disclaimer.

(21) Appl. No.: 11/074,554

(22) Filed: Mar. 7, 2005

Related U.S. Application Data

(63) Continuation of application No. 09/514,577, filed on Feb. 28, 2000, now Pat. No. 7,016,337.

(51) Int. Cl.
*H04J 3/02* (2006.01)
(52) U.S. Cl. .................................................. 370/537
(58) Field of Classification Search ............ 370/326, 370/468, 522, 352, 487, 537, 242, 252, 412, 370/535, 391, 342; 375/240, 341; 348/386, 348/384, 396, 390; 725/116, 117, 118, 146; 709/203
See application file for complete search history.

(56) References Cited

U.S. PATENT DOCUMENTS

| | | | |
|---|---|---|---|
| 5,544,156 A * | 8/1996 | Teder et al. ............ | 370/342 |
| 5,606,369 A * | 2/1997 | Keesman et al. ....... | 375/240.01 |
| 5,710,784 A | 1/1998 | Kindred et al. | |
| 5,719,872 A * | 2/1998 | Dubberly et al. ....... | 370/487 |
| 5,861,919 A | 1/1999 | Perkins et al. | |
| 5,862,140 A | 1/1999 | Shen et al. | |
| 5,889,561 A * | 3/1999 | Kwok et al. ............ | 375/240.03 |

(Continued)

OTHER PUBLICATIONS

International Organisation for Standardisation Organisation Internationale De Normalisation, "Generic Coding of Moving Pictures and Associated Audio: Systems", ISO/IEC JTC1/SC29/WG11/N0801, Nov. 13, 1994.

(Continued)

*Primary Examiner*—Wing F Chan
*Assistant Examiner*—Prenell P Jones
(74) *Attorney, Agent, or Firm*—Weaver Austin Villeneuve & Sampson LLP

(57) ABSTRACT

A system and method for multiple channel statistical re-multiplexing preferably includes a plurality of encoders each coupled to a respective channel and producing a compressed channel, a statistical re-multiplexer and a transport medium. The statistical re-multiplexer preferably has a plurality of inputs and an output for combining the input compressed channels into a single output bit stream. The statistical multiplexer further includes a plurality of de-multiplexers and a scheduler & multiplexer having a plurality of buffers, a scheduling table and a controller. Each of the buffers receives and stores compressed data from a respective encoder for a respective channel. The output of each buffer is coupled to a respective de-multiplexer that re-encodes the compressed channel in response to control signals from the scheduler & multiplexer. The scheduler and multiplexer receive the re-multiplexed streams from the re-multiplexers, and combine them into a single stream that matches the bandwidth of the physical transport medium.

16 Claims, 16 Drawing Sheets

U.S. PATENT DOCUMENTS

| | | | |
|---|---|---|---|
| 5,898,833 A * | 4/1999 | Kidder | 709/234 |
| 5,956,088 A * | 9/1999 | Shen et al. | 375/240.25 |
| 6,195,388 B1 * | 2/2001 | Choi et al. | 375/240.05 |
| 6,201,798 B1 * | 3/2001 | Campanella et al. | 370/326 |
| 6,205,151 B1 * | 3/2001 | Quay et al. | 370/416 |
| 6,226,328 B1 | 5/2001 | Assuncao | |
| 6,230,203 B1 * | 5/2001 | Koperda et al. | 709/229 |
| 6,259,733 B1 * | 7/2001 | Kaye et al. | 375/240 |
| 6,269,078 B1 * | 7/2001 | Lakshman et al. | 370/230 |
| 6,310,915 B1 * | 10/2001 | Wells et al. | 375/240.03 |
| 6,339,450 B1 | 1/2002 | Chang et al. | |
| 6,434,197 B1 * | 8/2002 | Wang et al. | 375/240.29 |
| 6,466,623 B1 | 10/2002 | Youn et al. | |
| 6,498,816 B1 * | 12/2002 | Easwar et al. | 375/240.26 |
| 6,577,682 B1 | 6/2003 | Brightwell et al. | |
| 6,640,239 B1 * | 10/2003 | Gidwani | 709/203 |
| 7,016,337 B1 * | 3/2006 | Wu et al. | 370/352 |
| 7,173,947 B1 * | 2/2007 | Ramakrishnan et al. | 370/537 |

OTHER PUBLICATIONS

Huifang, Sun et al., "Architectures for MPEG Compressed Bitstream Scaling" IEEE Transactions on Circuits and Systems for Video Technology, vol. 6, No. 2, Apr. 1996, pp. 191-199.

Wei Ding, "Joint Encoder and Channel Rate Control of VBR Video over ATM Networks", IEEE Transactions on Circuits and Systems for Video Technology, vol. 7, No. 2, Apr. 1997, pp. 266-278.

\* cited by examiner

SYSTEM AND METHOD FOR MULTIPLE CHANNEL STATISTICAL RE-MULTIPLEXING

CROSS-REFERENCE TO RELATED APPLICATION

This application is a continuation of U.S. patent application Ser. No. 09/514,577 filed Feb. 28, 2000 now U.S. Pat. No. 7,016,337 in the name of Fang Wu, Sangeeta Ramakrishnan and Ji Zhang, and entitled "System and Method For Multiple Channel Statistical Re-Multiplexing," which is incorporated herein by reference in its entirety and for all purposes.

BACKGROUND OF THE INVENTION

1. Field of the Invention

The present invention relates generally to systems and methods for processing compressed bitstreams of data. In particular, the present invention relates to a system and a method for multiplexing a plurality of channels for transmission over a single medium. Still more particularly, the present invention relates to a system and method for statistical re-multiplexing multiple channels.

2. Description of the Related Art

There are presently a variety of different communication channels for transmitting or transporting video data. For example, communication channels such as digital subscriber loop (DSL) access networks. ATM networks, satellite, or wireless digital transmission facilities are all well known. The present invention relates to such communication channels, and for the purposes of the present application a channel is defined broadly as a connection facility to convey properly formatted digital information from one point to another. A channel includes some or all of the following elements: 1) physical devices that generate and receive the signals modulator/demodulator); 2) physical medium that carries the actual signals; 3) mathematical schemes used to encode and decode the signals; 4) proper communication protocols used to establish, maintain and manage the connection created by the channel. The concept of a channel includes but is not limited to physical channel, but also logical connections established on top of different network protocols, such as xDSL, ATM, wireless, HFC, coaxial cable, etc. Storage systems, such as magnetic tapes, optical disks, can also be considered as part of a channel, but the present invention is not discussed in this context.

The channel is used to transport a bitstream, or a continuous sequence of binary bits used to digitally represent compressed video audio or data. The bit rate is the number of bits per second that the channel is able to transport. The bit error rate is the statistical ratio between the number of bits in error due to transmission and the total number of bits transmitted. The channel capacity (or channel bandwidth) is the maximum bit rate at which a given channel can convey digital information with a bit error rate no more than a given value. A video channel or video program refers to one or more compressed bitstreams that are used to represent the video signal and the associated audio signals. Also included in the video channel are relevant timing, multiplexing and system information necessary for a decoder to decode and correctly present the decoded video and audio signals to the viewer in a time continuous and synchronous manner. There may be one or more video signals and one or more audio signals per channel. However, in all realistic cases, each video channel has one video bit stream, together with one or more compressed audio bit streams. A multiplex is a scheme used to combine bit stream representations of different signals, such as audio, video, or data, into a single bit stream representation. In contrast, re-multiplex is a scheme used to combine bit stream representations of different multiplexed signals into a single bit stream representation.

A digital video signal is a sequence of digitized images that are obtained from the source and displayed in the destination in a synchronized manner. Digitized video sequence, when left in its original digitized form and transmitted over digital communication channels, requires significant amount of channel bandwidth. The digital video compression techniques, such as MPEG-1/2/4 and H.26X, can be used to dramatically reduce the channel bandwidth required to transmit the signal. However, the compression technique also introduces significant computational complexity into both the encoding and decoding process. Specifically, the compressed video bit streams, at any given bit rate, cannot be altered again to a different bit rate without decoding and re-encoding. In addition, the resulting number of bits required to represent digital video pictures varies from picture to picture and the coded pictures are highly correlated via motion estimation. The problem of delivering real-time digital video bit stream over a channel of a given bandwidth becomes a problem of matching the available bandwidth to the coded video bit stream rate. When the mismatch occurs, re-encoding, or re-compression, must be done.

Digital Video Compression

Digital video compression is the two-dimensional signal processing that allows digitized video frames to be represented digitally in a much more efficient manner. Compression of digital video makes it practical to transmit the compressed signal by digital channels at a fraction of the bandwidth required to transmit the original signal without compression. International standards have been created on video compression schemes. These include MPEG-1, MPEG-2, H.261, H.262, H.263. etc. These standardized compression schemes mostly rely on several key algorithm schemes as Shown in FIG. 1 including: motion compensated encoding, transform coding (DCT transforms or wavelet/sub-band transforms), quantization of the resulting coefficients, and variable length encoding. The motion compensated encoding 10 removes the temporally redundant information inherent in video sequences. The transform coding 12 enables orthogonal spatial frequency representation of spatial domain representation of the video sequence. Quantization 14 of the transformed coefficients reduces the number of levels required to represent a given digitized video sample and is the major factor in bit usage reduction in the compression process. The other factor contributing to the compression is the use of variable length coding (VLC) 16 so that most frequently used symbols are represented by the shortest code word. In general, the number of bits used to represent a given image determines the quality of the decoded picture. The more bits used to represent a given image, the better the image quality. The hardware or software system that compresses digitized video sequence using the above described bit stream schemes is called an encoder or encoding system. In these compression schemes, the quantization scheme is a lossy, or irreversible process. Specifically it results in loss of video textural information that cannot be recovered by further processing at a later stage. In addition, the quantization process has a direct effect on the resulting bit usage and decoded video quality of the compressed bit stream. The schemes in which the quantization parameters are adjusted control the resulting bit rate of the compressed bit stream. The resulting bit stream can have either constant bit rate (CBR) or variable bit rate (VBR). A CBR compressed bit stream can be transmitted over a channel that requires the input bit rate to the channel to be constant over time. Compressed video bit streams are generally intended for real-time decoded playback at a different time or location. The decoded real-time playback must be done at 30 frames per second for NTSC standard video and 25 frames per second for PAL standard video. Thus, all of the information required to represent a digital picture must be delivered to the destination in time for decoding and display in a timely manner. Therefore, this requires that the channel must be capable of making such delivery.

From a different perspective, the transmission channel imposes a bit rate constraint on the compressed bit stream. In general, the prior art adjusts the quantization in the encoding process so that the resulting bit rate can be accepted by the transmission channel. Because both temporal and spatial redundancies are removed by the compression schemes and because of variable length encoding, the resulting bit stream is very sensitive to bit errors or bit losses in the transmission process compared with transmission of uncompressed video data. In other words, minor bit error or loss of data in compressed bit stream typically results in major loss of video quality or in a complete shutdown of operation of the digital receiver/decoder. Furthermore, real-time multimedia bit streams are highly sensitive to delays. A compressed video bit stream, when transmitted under excessive and jittery delays, causes the real-time decoder buffer to under flow or overflow, causing the decoded video sequence to be jerky, or causing a loss of synchronization between the audio and video signals. Another consequence of the real-time nature of compressed video decoding is that lost compressed data will not be re-transmitted. Because of this sensitivity of compressed bit streams, there is a reluctance to change, modify or re-encode compressed bit streams in the prior art.

Re-Encoding

Re-encoding is the process of performing decoding on an input compressed bit stream and then encoding back to a compressed bit stream. The prior art includes many ways to apply rate conversion, or re-encoding, to one or multiple compressed bit streams. FIG. 2 shows a block diagram of a prior art system for transmitting video data over a communication channel showing the encoding and decoding function in more detail. In particular, as shown, the encoding includes receiving raw video data and processing the raw video data with motion estimation 50, transform coding 52, quantization 54, and VLC encoding 54 to produce a compressed bit stream. The compressed bit stream can then, because of its reduced size, be transmitted over any one of a variety of prior art transportation systems 58. The decoding process is then applied to the compressed bit stream received from the transportation system 58 to obtain the original raw video images. The decoding includes VLC decoding 60, dequantization 62, inverse transform coding 64, and motion compensation 66, all in a conventional manner.

For the purpose of rate conversion in the compressed domain, some exemplary prior art procedures are shown in FIG. 3. For the present invention, re-encoding is defined in its broadest sense to include partial decoding, recoding, re-quantization, re-transforming, and complete decoding and recoding. Referring now to FIG. 3, each of these types of re-encoding are defined with more particularity. Some of the elements shown may also be needed for decoding and encoding of the video data. Hence in actual implementation, these common elements may be shared between the re-encoder 300 and the decoder/encoder. Partial decoding refers to path E where the bit stream is partially decodes system syntax, and video syntax down to the picture header to perform frame accurate flexible splicing. Re-coding refers to path D where variable length encoding and decoding are performed and the DCT coefficients may be truncated to zero without even going through the inverse quantization steps. This approach requires the least processing, but in general causes the greatest amount of quality degradation. Re-quantization refers to path C where variable length encoding, de-quantization, quantization and decoding are performed but no transform coding is used. The transform coefficients (DCT coefficients) are requantized before being VLC encoded back. Re-transformation refers to path B where variable length decoding, de-quantization, inverse transformation, forward transform coding, quantization and encoding are performed. The video frames are constructed without using motion compensation. In the case of B or P pictures, this would mean some of the coded blocks are motion estimated residual errors. Some form of spatial filtering may be used before forward transform coding is used in the encoding process. Recoding refers to path A where the bit streams are complete decoded to raw video and then encoded including the use of motion estimation and compensation. Each of the paths A, B, C, D, E includes a rate converter for adjusting the rate of the bit stream to ensure buffer compliance. Each of the rate converters may be different. For example, the rate converter on path A may be a spatial filter and the rate converter on path C may perform a quantization step size adjustment while the rate converter on path D performs high frequency elimination. Those skilled in the art will also recognize that the components of the re-encoder 300 used (e.g., the path through the re-encoder 300) could also be variably controlled to provide variable bit rate conversion using the re-encoder 300. In various embodiments, the re-encoder 408 may include all, only some or any combination of these components according o which re-encoding, re-quantization, re-transforming and re-coding may be performed.

Generally, motion estimation and compensation is the most computationally expensive; transform coding and inverse transform coding are also quite expensive. In general, without special hardware to perform these functions, motion estimation and compensation will take over 80%-90% of the overall decode-encode computation load. The key to a simplified rate conversion scheme is therefore to bypass some of these expensive steps. For example, in FIG. 3, if we take the path B, motion estimation and compensation is avoided. If we take path C, both motion estimation and compensation and transform coding are eliminated. If we take path D, quantization steps are also eliminated, in addition to motion estimation and compensation and transform coding. Of course, path A performs the entire decoding and encoding process, resulting in the most flexibility and potentially the best quality, and is computationally the most expensive.

MPEG-2 Bit Stream Syntax

Those methods mentioned above can be applied to MPEG-2 program streams, MPEG-1 streams or other video conferencing compression standards. Thus, while the present invention can be applied to any of the various compression technique and is not limited, it will be discussed in the present application in the context of MPEG-2 by way of example. This section provides brief overview of the MPEG-2 bit stream syntax for better understanding the concepts in the invention.

MPEG-2 compression standard consists of two layers of information. Their relationship can be illustrated via FIG. 4. The bottom layer is the elementary stream (ES) layer. This layer defines how compressed video (or audio) signals are sampled, motion compensated, transform coded, quantized, and represented by different variable length coding (VLC) tables. The re-encoding of a pre-compressed MPEG-2 bit stream is a process in which the bit stream signal is redefined in this layer.

The next layer is the system layer. The system layer is defined to allow the MPEG-2 decoder to correctly decode audio and video signals and present the decoded result to the video screen in a time continuous manner. The system layer also includes provisions that allow unambiguous multiplexing and separation of audio and video compressed signals, and different channels of audio and video compressed signals. The system layer consists of two sublayers. The first layer is the PES layer; this layer defines how the ES layer bit stream is encapsulated into variable length packets, called PES packets. In addition, presentation and decoding time stamps are added to the PES packets. There are two different sub-layers above the PES layer, the transport layer and program system layer.

The transport layer defines how the PES packets are further packetized into fixed sized transport packet of 188 bytes. Additional timing information and multiplexing information are added to the transport layer. The resulting stream of transport packets is called transport stream. Transport stream is optimized for use in environments where errors are likely, such as storage or transmission in lossy or noisy media. Typical applications of transport stream include Direct Broadcast Service (DBS), digital or wireless cable services, broadband transmission systems, etc.

The program system layer defines how the PES packets are encapsulated into variable size packets. Additional timing and multiplexing information are added to the program system layer. The program stream is designed for use in relatively error-free environments and is suitable for applications that may involve software processing of system information such as interactive multimedia applications. Typical applications of program stream include Digital Versatile Disks (DVD) and video servers.

In general a video bit stream can be in elementary stream (ES) format, which means that no PES, transport or program system layer information is added to the bit stream. The video bit stream can also be represented in the form of PES stream, transport stream or program stream. For a given video bit stream, the difference between these different bit streams represented in the different layers lies in the timing information, multiplexing information and other information not directly related to the re-encoding process. The information required to perform re-encoding, however, is contained in the elementary stream layer. The ensuing discussion on re-encoding is, therefore, not limited to bit streams in any one of the layers. In other words, the discussion on how to re-encode bit streams in one layer, say in elementary stream layer, can be straightforwardly extended to PES stream, transport stream or program streams as well.

With the above background, the system and method for multiple channel statistical re-multiplexing will now be discussed.

SUMMARY OF THE INVENTION

The present invention is a system and method for multiple channel statistical re-multiplexing. More particularly, the present invention focuses on methods for manipulating including recoding of multiple compressed bit streams such that the resulting bit stream rate matches the available channel capacity. Through the use of manipulation, the present invention provides loss-less transmission of compressed video bit streams in real-time. The system of the present invention includes a plurality of encoders each coupled to a respective channel and producing a compressed channel, a statistical multiplexer and a transport medium. The statistical multiplexer preferably has a plurality of inputs and an output for combining the input compressed channels into a single output bit stream. The statistical multiplexer further comprises a plurality cf buffers, a plurality of re-multiplexers and a scheduler & multiplexer. Each of the buffers receives and stores compressed data from a respective encoder for a respective channel. The output of each buffer is coupled to a respective re-multiplexer that re-encodes the compressed channel in response to control signals from the scheduler & multiplexer. The scheduler & multiplexer receive the re-multiplexed streams from the re-multiplexers, and combine them into a single stream that matches the bandwidth of the physical transport medium. The scheduler & multiplexer control the encoding rate for each of the re-multiplexers thereby ensuring that when combined, the output matches the channel bandwidth of the transport medium. The present invention also includes a method for performing statistical re-multiplexing including the steps of: performing bit stream analysis; determining a sending rate for each channel; determining whether the combined bandwidth requirement of all the channels exceeds the channel capacity; performing rate adjustment by re-multiplexing the channels if the combined bandwidth requirement of all the channels exceeds the channel capacity, scheduling the channels for transmission, combining the channels and transmitting the combined channels over the transport medium.

DETAILED DESCRIPTION OF THE PREFERRED EMBODIMENTS

While the present invention will now be described with particularity for the handling of MPEG-2 digital video compression, those skilled in the art will recognize that the principles of the present invention may be applied to a variety of other related video compression schemes such as the H.26X videoconference signals. Specifically, the present application discloses a technique of performing re-multiplexing to ensure that the bit rate of transmission matches the channel capacity. Furthermore, those skilled in the art will recognize that even though a compressed bit stream typically consists of a multiplex of compressed audio, video and auxiliary data bit streams, the bit rate reduction process discussed below refers only to the process applied to compressed video bit streams.

System Overview

Figure 5A:
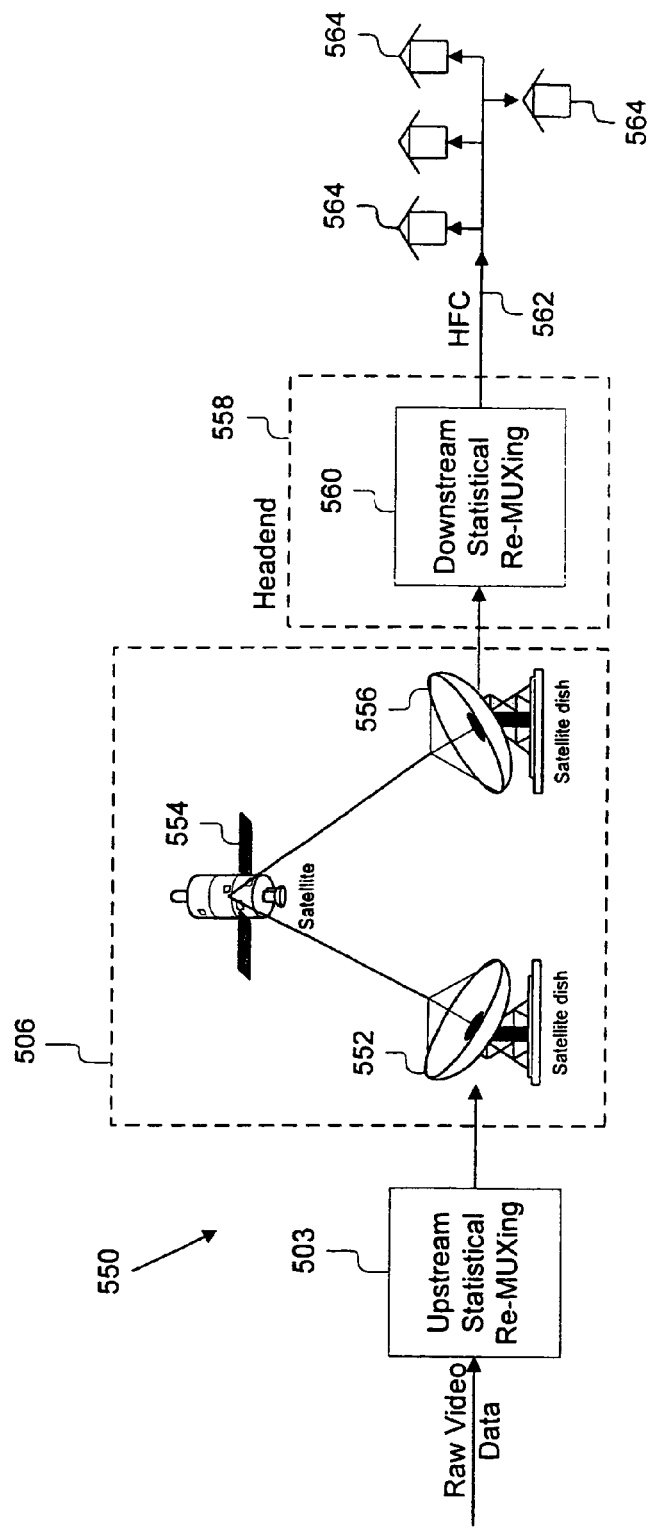
FIG. 5A is a block diagram of preferred embodiment of system including statistical re-multiplexing before and after transmission according to the present invention.

Referring now to FIG. 5A, a block diagram of an exemplary transmission system 500 using the present invention is shown. While the present invention is shown in, the context of providing video signal such as in cable television systems, the present invention may be used in any context and this context is provided only by way of example. The present invention is directed to use of transcoding to perform what is referred to as "open-loop" statistical multiplexing. In other words, prior art statistical multiplexing requires the close-loop feedback between the statistical multiplexing device and the encoding device so that the encoder performs the rate adjustment. In contrast, the present invention provides statistical re-multiplexing, with transcoding capability that performs the transcoding. As shows in FIG. 5A, the present invention may be used in different places or application. FIG. 5A shown a video distribution system 550 very generally. The system 550 includes a device 503 for upstream multiplexing, a transport medium 506, a head end 558, a hybrid-fiber coaxial (HFC) network 562, and homes or receivers 564. Those skilled in the art will recognize that this is a general block diagram and many of the conventional components are not shown of convenience and ease of understanding. The raw video data is received from one or more sources and provided to the up-stream statistical re-multiplexing system 503. The up-stream statistical re-multiplexing system 503 provides rate conversion as necessary to provide a constant bit rate the matches the bandwidth provided by the transport medium 506. The up-stream statistical re-multiplexing system 503 will be described in more detail below with reference to FIG. 5B. The output of the up-stream statistical re-multiplexing system 503 is provided to the transport medium 506, in particular a satellite up link 552. The transport medium 506 preferably comprises the satellite up link 552, a satellite 554, and a satellite down link 556 as well as other optical couplings of a conventional type as will be understood to those skilled in the art. The satellite down link 556 is preferably coupled to a cable television head end 55S in a conventional manner. In addition to the conventional components of a head end, the present invention provides for addition of a down-stream statistical re-multiplexing system 560. The down-stream statistical re-multiplexing system 560 is coupled to a HFC network 562 and provides rate conversion as necessary to provide a constant bit rate the matches the bandwidth provided by the HFC network 562. The down-stream statistical re-multiplexing system 560 will be described in more detail with reference to FIG. 5C below.

Figure 5B:
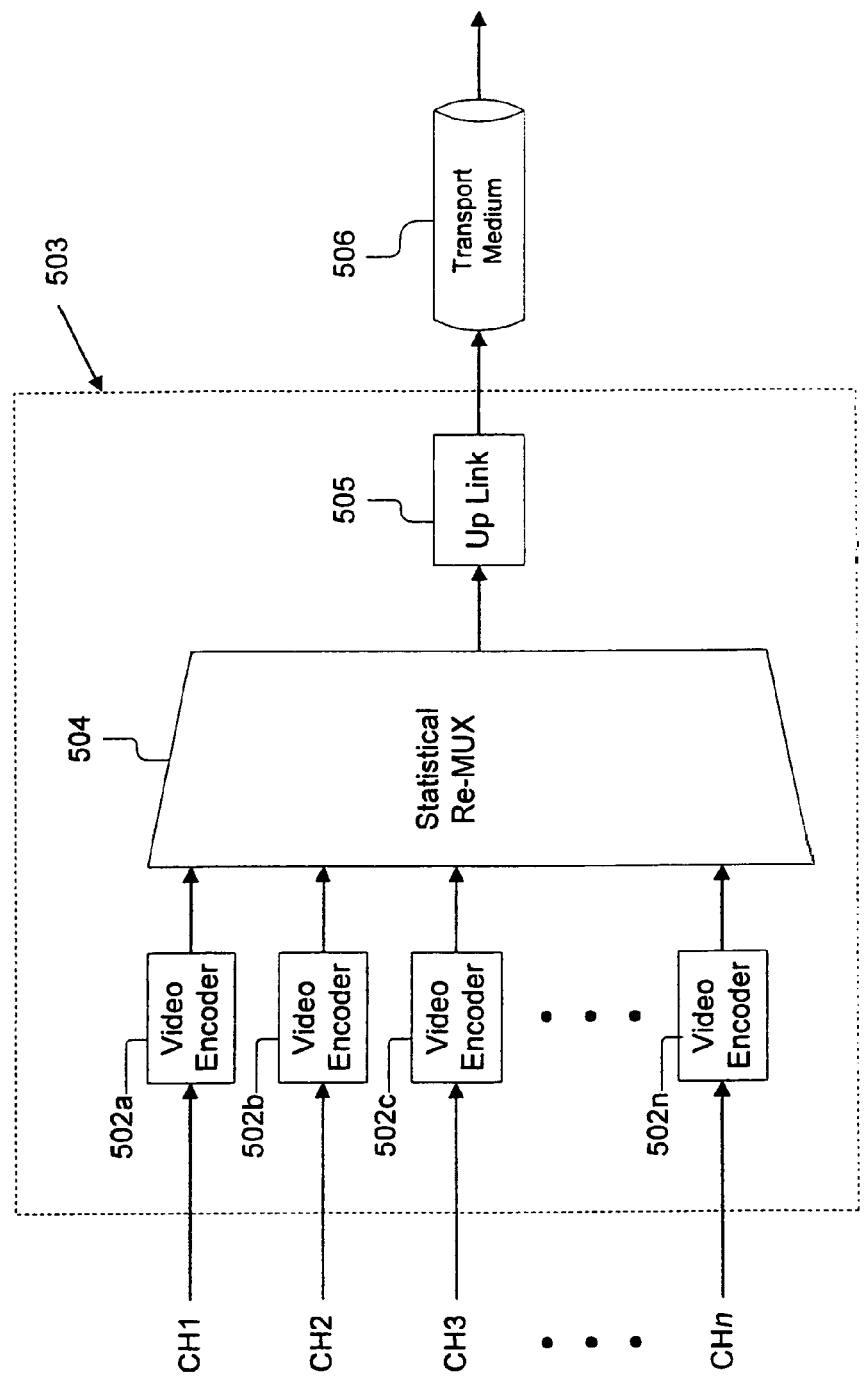
FIG. 5B is a block diagram of preferred embodiment for statistical re-multiplexing before transmission.

Referring now to FIG. 5B, a preferred embodiment of the up-stream statistical re-multiplexing system 503 constructed according to the present invention and including statistical re-multiplexing is shown. The system 503 is adapted for use on an MPEG-2 transport stream. The preferred embodiment of the system 503 preferably comprises a plurality of video channels, CH1-CHn, providing video sequences, a plurality of video encoders 502a-n, a statistical re-multiplexer 504, and a up-link converter 505. Each of the plurality of video encoders 502a-n is coupled to receive a respective one of the plurality of video channels, CH1-CHn. Each channel CH1-CHn preferably provides a non-compressed stream of video sequences that is input to a respective video encoder 502a-n. Each video encoder 502a-n in turn compresses the received video sequences to produce a compressed bit stream. The statistical re-multiplexer 504 preferably has a plurality of inputs for receiving the compressed video sequences and for combining the input compressed channels into a single output bit stream provide at its output. The statistical re-multiplexer 504 further comprises a plurality of de-multiplexers 802a-n and a scheduler & multiplexer 804, as will described in more detail below with reference to FIG. 8. The statistical re-multiplexer 504 receives and stores compressed data for each respective channel. The statistical re-multiplexer 504 re-encodes the compressed channel in response to control signals from the scheduler & multiplexer 804 and combines the re-encoded channels into a single bit stream of output over the transport medium 506. The statistical multiplexing is controlled by the scheduler 804 that determines the order of the programs in which to transmit the packets. The bit rate of the output of the statistical multiplexer 504 preferably matches the bandwidth of the physical transport medium 506. The scheduler & multiplexer 804 control the output thereby ensuring that the output matches the channel bandwidth of the transport medium 506. The up-link converter 505 preferably couples the output of the statistical re-multiplexer 504 to the transport medium 506. The up-link converter 505 preferably formats the output of the statistical re-multiplexer 504 so that it may be sent over the transport medium 506 in a conventional manner. The up-link converter 505 in alternate embodiments may be part of the transport medium 506.

Figure 5C:
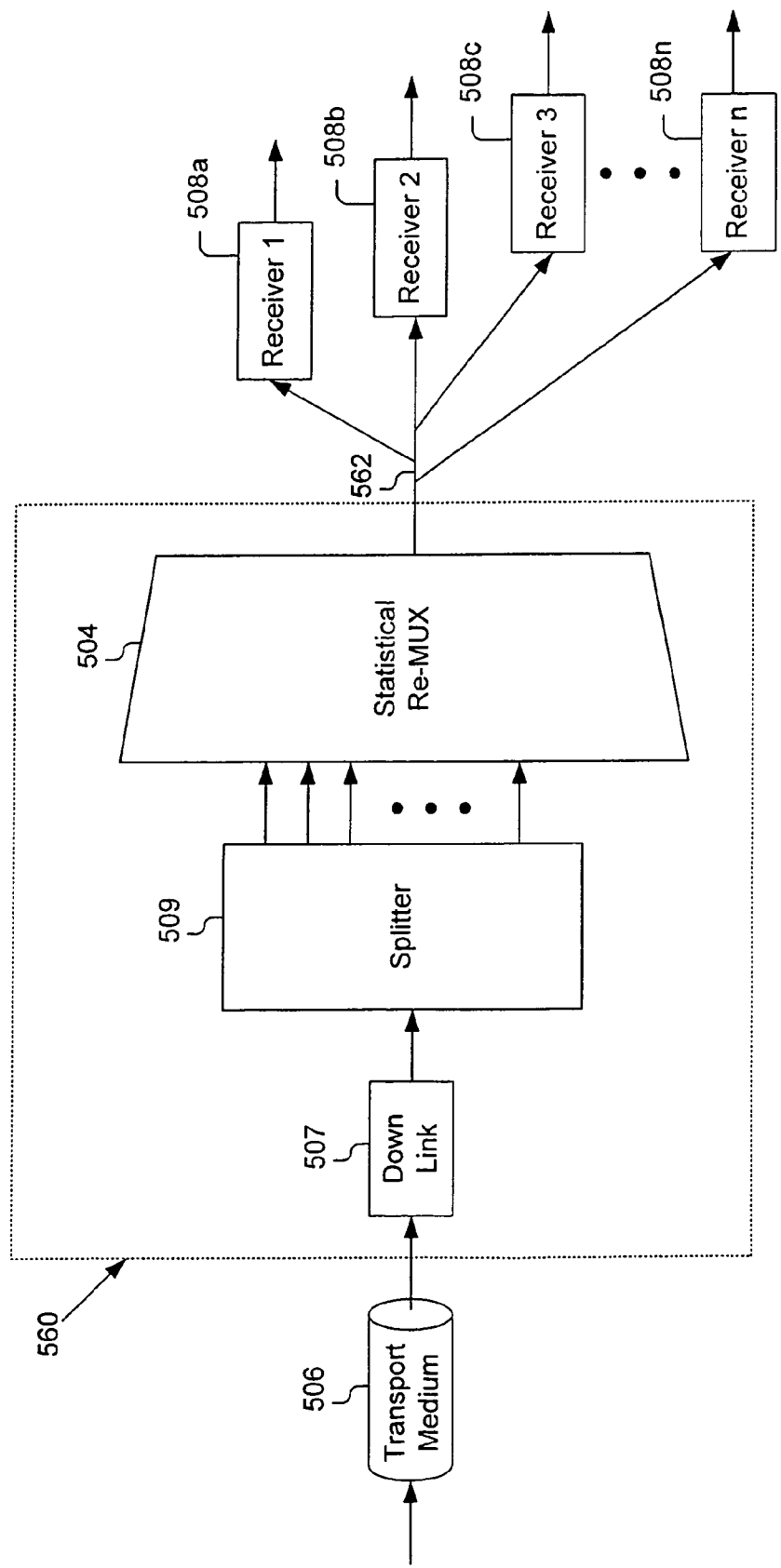
FIG. 5C is a block diagram of preferred embodiment for statistical re-multiplexing after transmission.

Referring now to FIG. 5C, a preferred embodiment of the down-stream statistical re-multiplexing system 560 constructed according to the present invention and including statistical re-multiplexing is shown. The system 560 is again adapted for use on an MPEG-2 transport stream. The preferred embodiment of the system 560 preferably comprises a down link converter 507, a splitter 509, and a statistical re-multiplexer 504. The down link converter 507 coupled the splitter 509 to the transport medium 506 and coverts the satellite transmission into a form usable by the splitter 509 in a conventional manner. Similarly, the splitter 509 receives a signal from the transport medium 506 and demodulates, splits and converters it into a plurality of signals on different channels. Thus, the splitter 509 has an input and a plurality of outputs. Each of the output of the splitter 509 provides a compressed sequence of video signals. The statistical re-multiplexer 504 is preferably the same as described above and used in the down-stream statistical re-multiplexing system 503, and will be described below in more detail with reference to FIG. 8. The output of the statistical re-multiplexer 504 is coupled to the HFC network 562. The same statistical multiplexed signal consisting of signals for all programs is broadcast to each of the receivers 508a-n. The HFC network 562 is in turn coupled to each of the plurality of receivers 508a-n. Each of the plurality of receivers 508a-n receives the entire bit stream from the statistical multiplexer 504, extracts the program content destined for other devices (not shown) coupled to the receiver 508a-n and decodes the compressed video signals.

Figure 6:
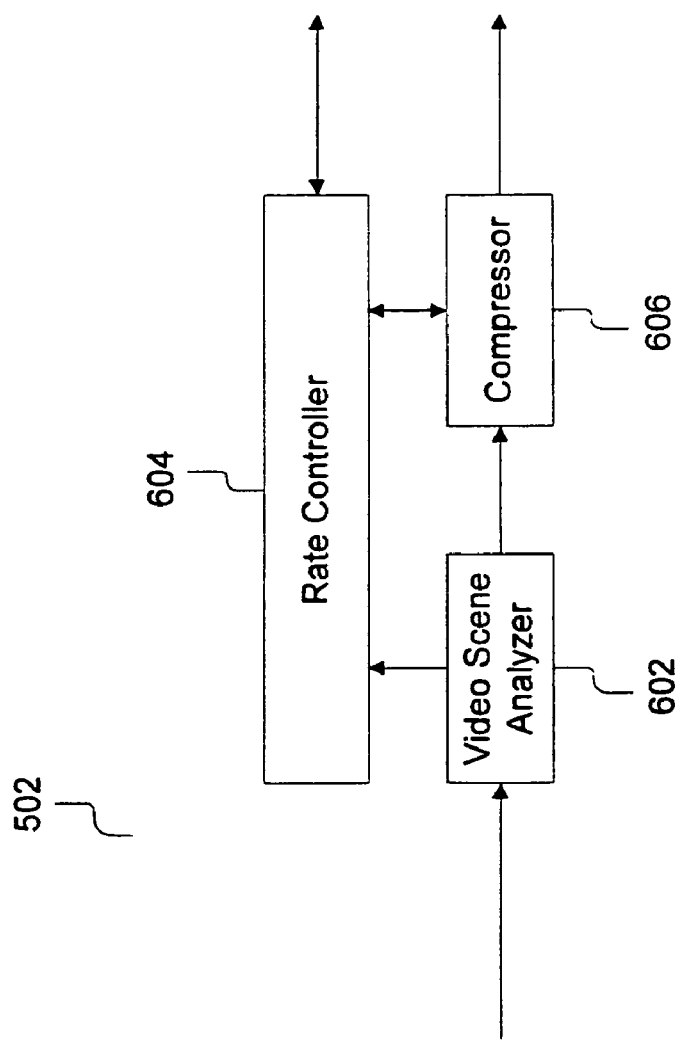
FIG. 6 is a block diagram of a preferred embodiment for a video encoder constructed according to the present invention.

Referring now to FIG. 6, a preferred embodiment of a video encoder 502 is shown. The video encoder 502 preferably comprises: a video scene analyzer 602, a rate controller 604, and a compressor 606. The video scene analyzer 602 has an input and a first and second output. The video scene analyzer 602 performs analysis on the video sequence to determine the complexity of the sequence as it is related to the video compression process. In other words, it provides information to the compressor as to how many bits are to be used to encode a particular video image. Typical measures used by the analyzer include: amount of motion, amount of texture, progressive or interlaced scanning format (telecine), scene changes and fades, as well as the amount of noise. The input of the video scene analyzer 602 is coupled to an input line to receive the uncompressed video data for a given channel. The first output of the video scene analyzer 602 is coupled to the rate controller 604 to provide information used by the rate controller to determine the amount and type of compression that the compressor 606 should perform. Typical information exchanged between the rate controller 604 and the video scene analyzer 602 includes: video complexity measure, scene cut location, fade location, progressive or interlaced. The second output of the video scene analyzer 602 is coupled to the input of the compressor 606. The second output provides the video data and relevant timing information so that it can be used by the compressor 606 to provide a bit stream at a desired bit rate. The compressor 606 similarly has a data input a data output and a control input/output. The data input of the compressor 606 is coupled to the output of the video scene analyzer 602, the data output forms the output of the encoder 502. The compressor 606 compresses the bit stream using the conventional methods described above including but not limited to motion compensated encoding, transform coding (DCT transforms or wavelet/sub-band transforms), quantization of the resulting coefficients, and variable length encoding. The compressor 606 is preferably able to perform any of the various types of compression in response to control signals from the rate controller 604. A compressor 606 is typically a real-time encoder. In the case of MPEG-2 encoding, the compressor 606 may also include audio compressor that generates compressed audio signals (preferably in AC-3 or MPEG format). The compressor 606 may generate the signals either in transport stream format (packets of 188 bytes). packetized elementary streams (PES) of variable length packets, or elementary streams (ES) of variable length packets. Other possible implementations of the compressors include software processing on general-purpose computers. The compressor may also include other types of video compression (such as H.26X or wavelet). The compressor 606 is coupled to the rate controller 604 to receive signals indicating the type of compression to be performed and preferred bit rates. Specifically, the rate controller 604 communicates with the compressor 606 to determine the optimal allocation of bits (called bit budgets) on a per coded picture basis. The compressor 606 in turn sends to the rate controller 604 the actual number of bits used to code each video image. The two components (604 and 606) exchange information each time a video picture is coded. The rate controller 604 has a plurality of ports and one port is coupled to the compressor 606, one to the video scene analyzer 602 and one to receive rate control information. The rate controller 604 specifies a bit rate for the bit stream output by the compressor 606. The rate controller 604 receives data from the video scene analyzer 602, specifies what bit rates are possible, and in response to signals from the statistical multiplexer 504 provides commands to the compressor 606 to perform compression that will achieve a desired bit rate. This can be done by any source (not shown) to control the video encoding (compression). However, in an alternate embodiment, the statistical re-multiplexer 504 sends messages to the rate controller 604 including targeted bit usage for the next coded pictures for all of the channels to be multiplexed. The rate controller 604 may also preferably send messages to the re-statistical multiplexer 504 as to the number of bits used for the coded pictures before the associated data is queued into the statistical multiplexer buffer.

Figure 7:
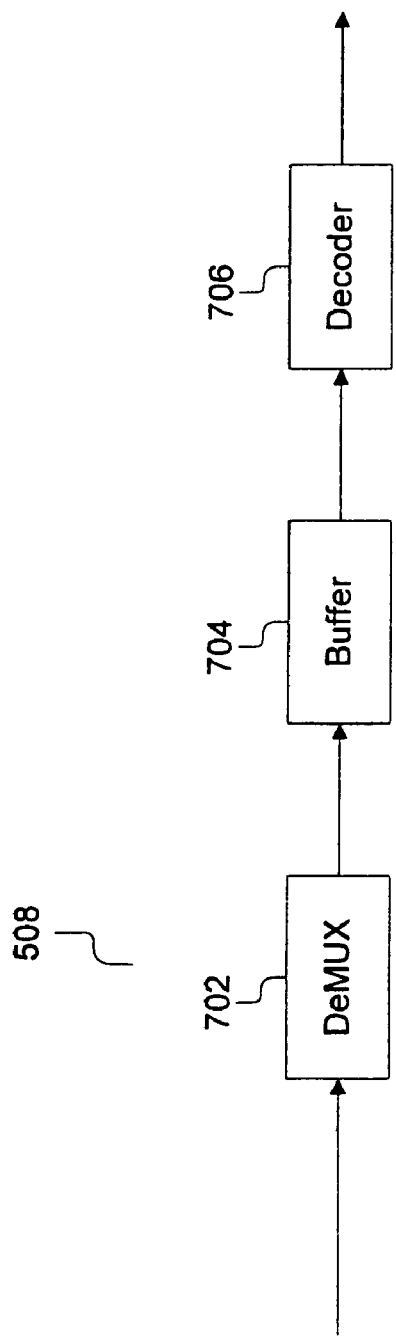
FIG. 7 is a block diagram of a preferred embodiment for a receiver constructed according to the present invention.

Referring now to FIG. 7, a preferred embodiment of a receiver 508 is shown. The receiver 508 preferably comprises: a de-multiplexer 702, a buffer 704 and a decoder 706. The de-multiplexer 702 has an input and an output, and preferably has its input coupled to the transport medium 506. Generally, the de-multiplexer 702 filters out all data not destined for this receiver. More specifically, the de-multiplexer 702 receives the bit stream sent by the statistical multiplexer 504 and extracts a video elementary stream payload from the video transport stream. The de-multiplexer 702 essentially performs the inverse function of the statistical multiplexer 504 but to a more limited extent. While the statistical multiplexer 504 combines re-multiplexed streams into a single stream, the de-multiplexer 702 receive the single stream and extracts the re-multiplexed channel corresponding to (or addressed to) the particular receiver 508 and discards the other information. The output of the de-multiplexer 702 provides the extracted re-multiplexed stream. The output of the de-multiplexer 702 is coupled to the input of a buffer 704. The buffer 704 is filled with packets destined for this particular decoder 706 at a rate determined by the channel transmission. The buffer 704 provides for temporary storage of the bit stream before decoding. The buffer 704 ensures that there is enough scenes from the compressed bit stream to perform decoding. Whether the buffer 704 over flows or under flows is dictated by the scheduling of channels (insertion of channel data) in the single bit stream by the statistical multiplexer 504. The output of the buffer 704 is coupled to the input of a decoder 706. The decoder 706 is any one of a conventional type as will understood by those skilled in the art and performs the inverse function of the compressor 606. Those skilled in the art will recognize that although only one decoder 706 is shown for each receiver 508, in reality, there may be multiple decoders 706 inside each receiver 508 because audio and video require different decoding processes. The output of the decoder 706 forms the output of the receiver 508 and provides the uncompressed video data ready for use.

Statistical Re-Multiplexer

Statistical re-multiplexing is a technique that simultaneously analyzes and performs necessary re-encoding with multiple channels of video signals and combines the resulting bit streams into a single bit stream for transmission. Statistical re-multiplexing explores the variable rate nature of the compressed video bit streams and the statistical nature of such bit rates. Specifically, it combines multiple channels of variable bit rate (VBR) bit streams of compressed video so that the resulting multiplex has a constant fixed rate. This technique, when properly implemented, results in significant bandwidth savings when transmitting multiple channels of pre-compressed digital video signals. The key difference from statistical multiplexing, therefore, is that the inputs to the statistical re-multiplexer 504 are pre-compressed bit streams. The re-scheduling of packets, re-encoding, together with the rate control and re-multiplexing forms the functionality of the statistical re-multiplexer 504 as will be described more detail below. The re-encoding, together with the rate control and re-multiplexing performs the same functions as that of statistical multiplexing. While the present invention will now be described with reference to re-multiplexing, those skilled in the art will recognize that the statistical re-multiplexer 504 may be used alone on the compressed video streams eliminating the need for the encoders 502 of FIG. 5B. In this case, the statistical re-multiplexer 504 performs re-coding, selective or complete re-coding, on all of the participating channels so that the multiplexed output bit stream has a given constant bit rate. Statistical re-multiplexing can be considered as the combination of selective re-coding and channel hopping.

Figure 8:
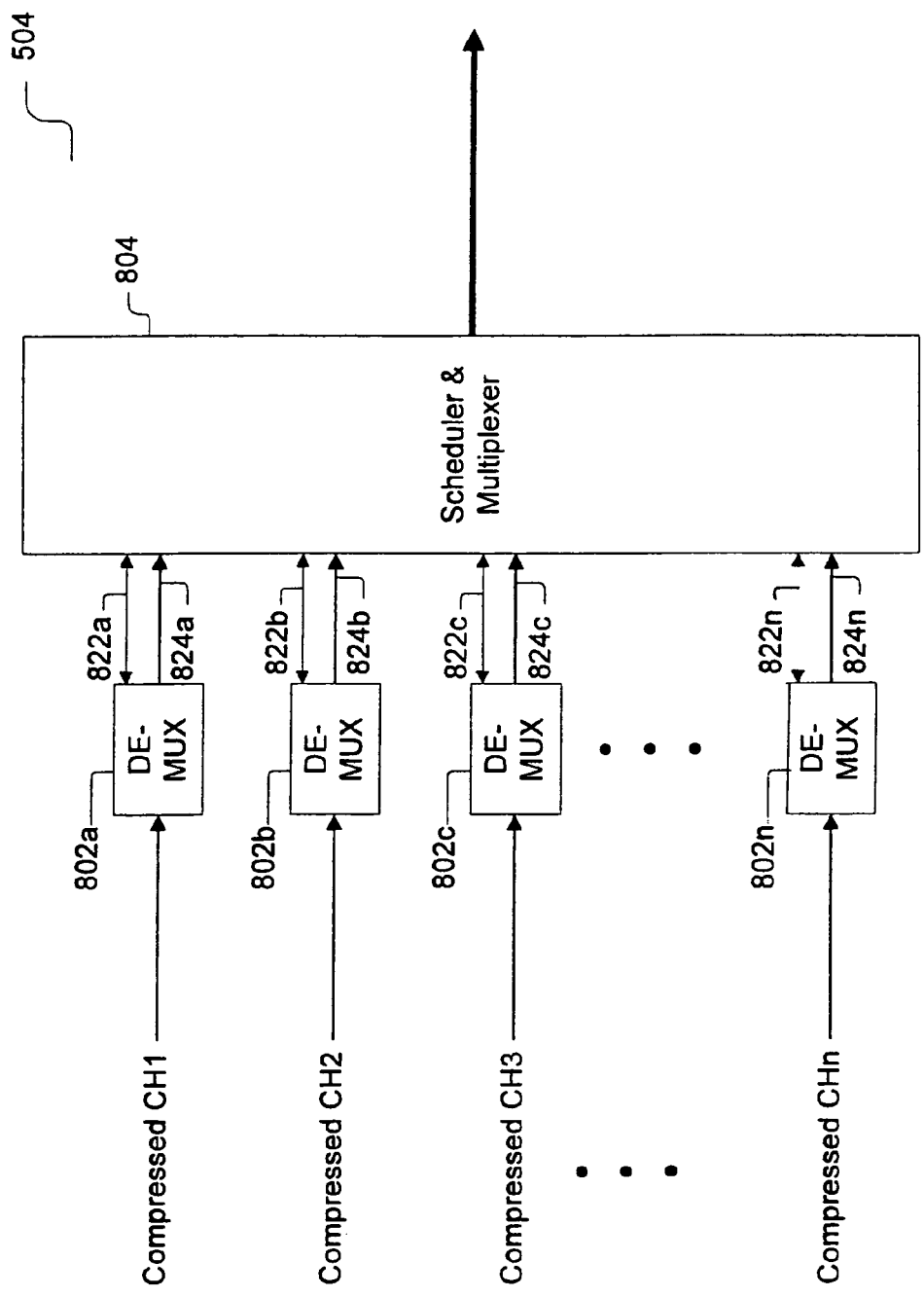
FIG. 8 is a block diagram of a preferred embodiment for a statistical multiplexer constructed according to the present invention.

Referring now to FIG. 8, the statistical multiplexer 504 is shown in more detail. FIG. 8 provides a statistical multiplexer 504 in an example where 4 channels (or programs) are statistically re-multiplexed. While the present invention shows only 4 channels being re-multiplexed, those skilled in the art will recognize that any number of programs or channels may be multiplexed. The statistical re-multiplexer 504 further comprises a plurality of de-multiplexers 802a-n, preferably one for each channel, and a scheduler & multiplexer 804. Each of the de-multiplexers 802a-n is coupled to receive a particular compressed channel and has a data output coupled to the scheduler & multiplexer 804 by line 824. The scheduler & multiplexer 804 has the functionality described above and is also coupled to a control input of the de-multiplexers 802 by line 822. The de-multiplexers 802 are described in more detail below with reference to FIG. 9. In an alternate embodiment (not shown), the scheduler & multiplexer 804 also has a second control input coupled by lines to respective encoders 502. The output of the scheduler & multiplexer 804 provides a bit stream that matches the channel capacity.

Figure 9:
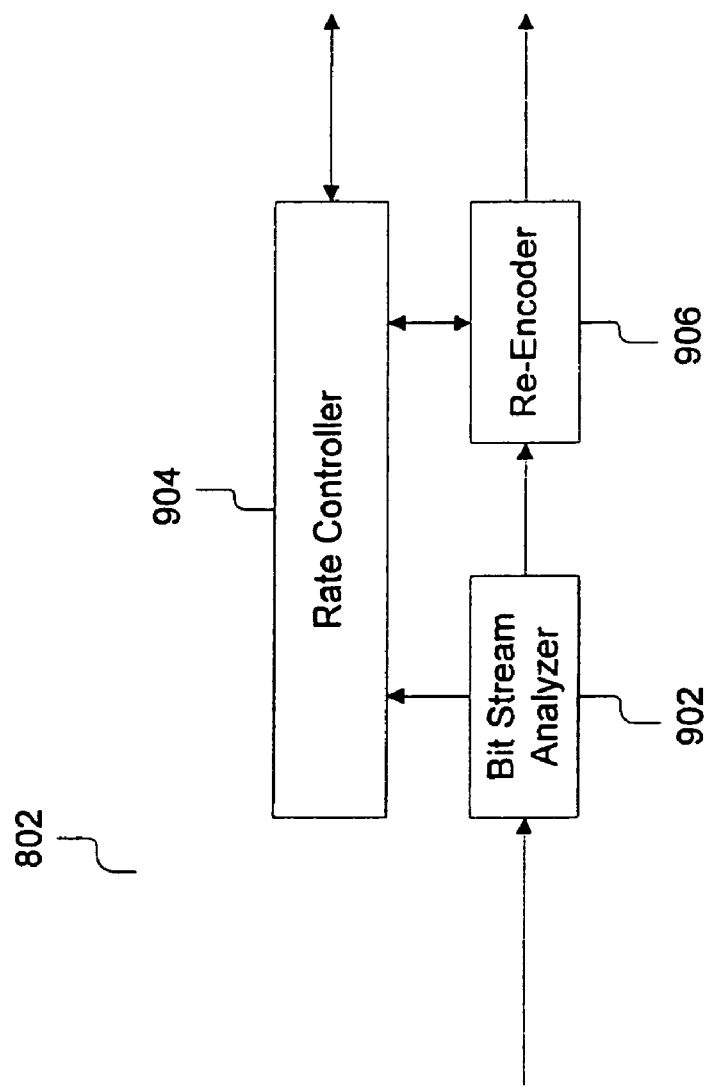
FIG. 9 is a block diagram of a preferred embodiment for a re-multiplexer constructed according to the present invention.

Referring now to FIG. 9, a preferred embodiment of a re-multiplexer 802 is shown. Each of the re-multiplexers 802 preferably comprises: a bit stream analyzer 902, a rate controller 904, and a re-encoder 906. The bit stream analyzer 902 has an input and a first and second output. The bit stream analyzer 902 parses the bit streams to determine the bit usage of each of the channels for some pre-determined amount of time, T seconds, ahead of what is currently being multiplexed and sent over the transport medium 506. The input of the bit stream analyzer 902 is coupled to an input line to receive the compressed video data for a given channel from a respective video encoder 502. The first output of the bit stream analyzer 902 is coupled to the rate controller 904 to provide information used by the rate controller to determine the amount and type of compression n that the re-encoder 906 should perform. The bit stream analyzer 902 is different from video scene analyzer 602 in that here the bit stream analyzer 902 operates in the compressed digital domain. In other words, the bit stream analyzer 902 inspects the input compressed video bits streams to extract information that can be used to assist the re-encoding process. The information may include: number of bits used for each of the coded pictures, picture coding type, average quantizer scale value for each of the coded pictures, whether the coded picture is coded due to fade or scene cuts in the original video sequence, etc. The second output of the bit stream analyzer 902 is coupled to the input of the re-encoder 906. The second output provides the video data and relevant timing information so that it can be used by the re-encoder 906 to provide a bit stream that is further compressed to have a desired bit rate.

Figure 1:
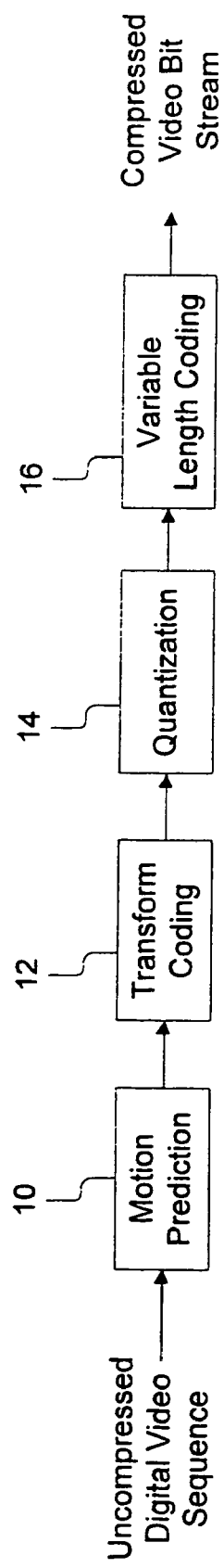
FIG. 1 is a block diagram of the general prior art method steps for compressing digital video sequences.
Figure 2:
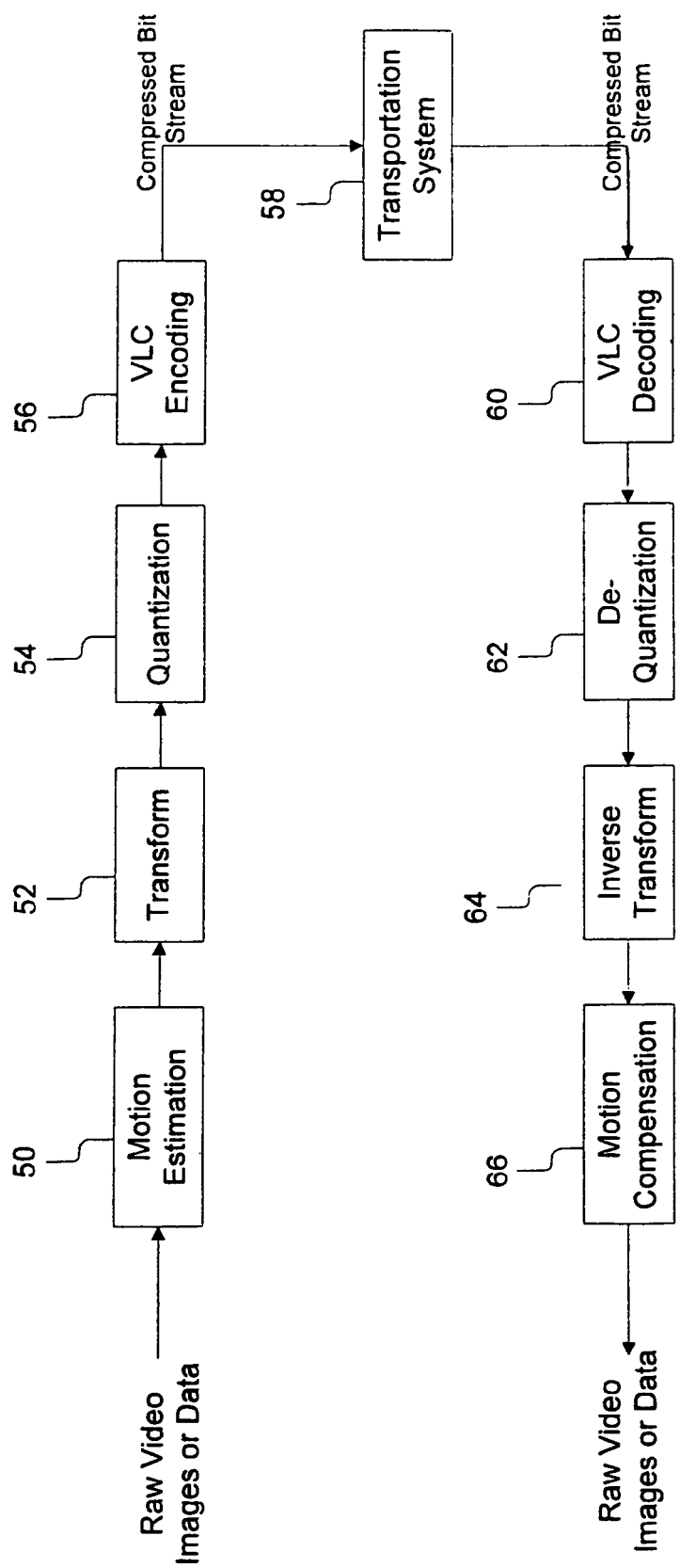
FIG. 2 is a block diagram of a prior art method for encoding, transmitting and decoding digital video sequences or images.
Figure 3:
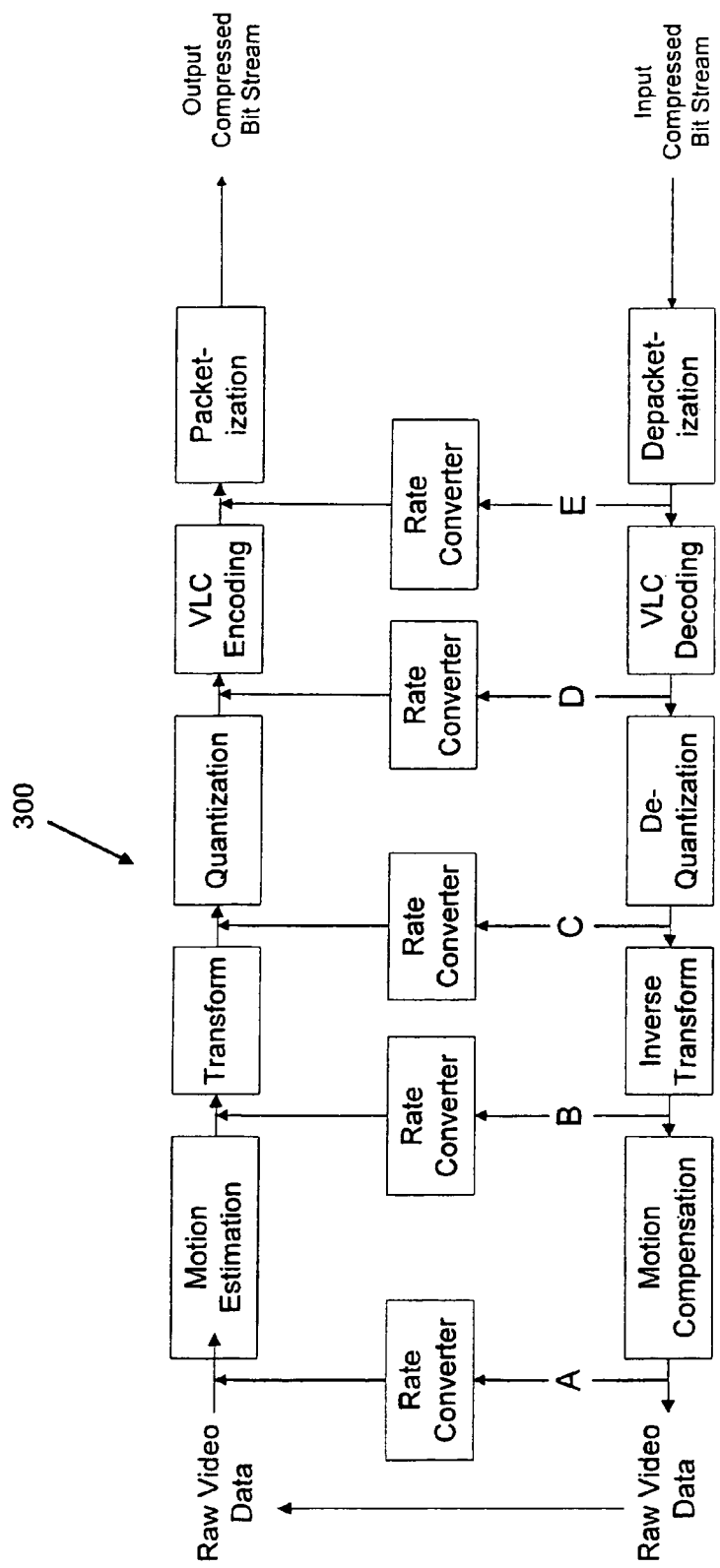
FIG. 3 is a block diagram of prior art method for performing rate conversion or re-encoding.
Figure 4:
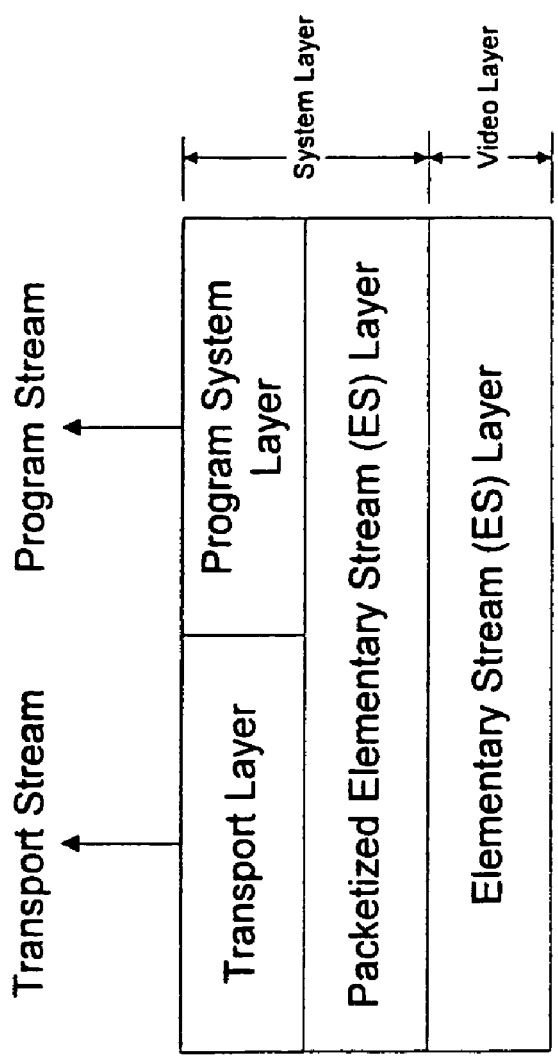
FIG. 4 is a block diagram graphically representing the layers of the MPEG-2 transport and program stream protocols.

The re-encoder 906 similarly has a data input, a data output and a control input/output. The data input of the re-encoder 906 is coupled to the output of the bit stream analyzer 902, and the data output forms the output of the re-multiplexer 802. The re-encoder 906 compresses the bit stream using the conventional methods described above including but not limited to motion compensated encoding, transform coding (DCT transforms or wavelet/sub-band transforms), quantization of the resulting coefficients, and variable length encoding. The re-encoder 906 is preferably able to perform any of various type of compression in response to control signals from the rate controller 904. The preferred embodiment for the re-encoder 906 can be either path A or B or C in FIG. 3. The re-encoder 906 also is able to affect rate changes in the cases where excessive rate reduction is required by dropping B-frames and repeating the previous frame. The re-encoder 906 is coupled to the rate controller 904 to receive signals indicating the type of compression to be performed and preferred bit rates. The information exchanged between the rate controller 904 and the re-encoder 906 is very similar to that of the rate controller 604 and the compressor 606.

The rate controller 904 has a plurality of ports and one port is coupled to the compressor 660, one to the bit stream analyzer 902 and one to the statistical multiplexer 504. The rate controller 904 specifies a bit rate for the bit stream output by the re-encoder 906. The rate controller 904 receives data from the bit stream analyzer 902, specifies what bit rates are possible, and in response to signals from the scheduler & multiplexer 804 provides commands to the re-encoder 906 to perform compression that will achieve a desired bit rate.

The statistical multiplexer 504 of the present invention is designed to ensure that the video bit-stream, when transmitted over the transport medium 506 to the destination, does not cause the decoder buffer 704 to under flow or overflow. Of course, the audio signals must also be properly scheduled so that decoder buffer 704 for audio does not overflow and under flow. Furthermore, the destination decoder 706 needs to maintain audio video synchronization at all times. These constraints can be described mathematically using the following definitions and assumptions. First, (i) is is used to represent channel i, and there are total of 1 video programs. Second, C is the total transmission channel capacity, in number of bits per second. Finally, R(i,t) is the bit rate used to transmit channel i at time t. With this notation, the statistical multiplexer 504 must satisfy the equation $\Sigma_{1 \leq i \leq l} R(i,t) \leq C$ for all t. In other words, at anytime t, the total transmission rate out of the statistical multiplexer 504 must not exceed the channel capacity. In addition, if R(i,t) is the sending bit rate for the statistical multiplexer 504 to send the bit stream for channel C at the given time t; $R_{min}(i,t)$ is the minimum bit rate required to transmit the bit stream data for a channel without underflowing the decoder buffer 706, at the given time t, $R_{max}(i, t)$ is the maximum bit rate to transmit the bit-stream data channel (i) without overflowing the decoder buffer, then to avoid decoder buffer overflow or underflow, we must have R min(i, t)≦R(i, t)≦$R_{max}$(i, t) for all t. The scheduler & multiplexer 804 is designed to ensure that this equation is satisfied for all channels.

Figure 10:
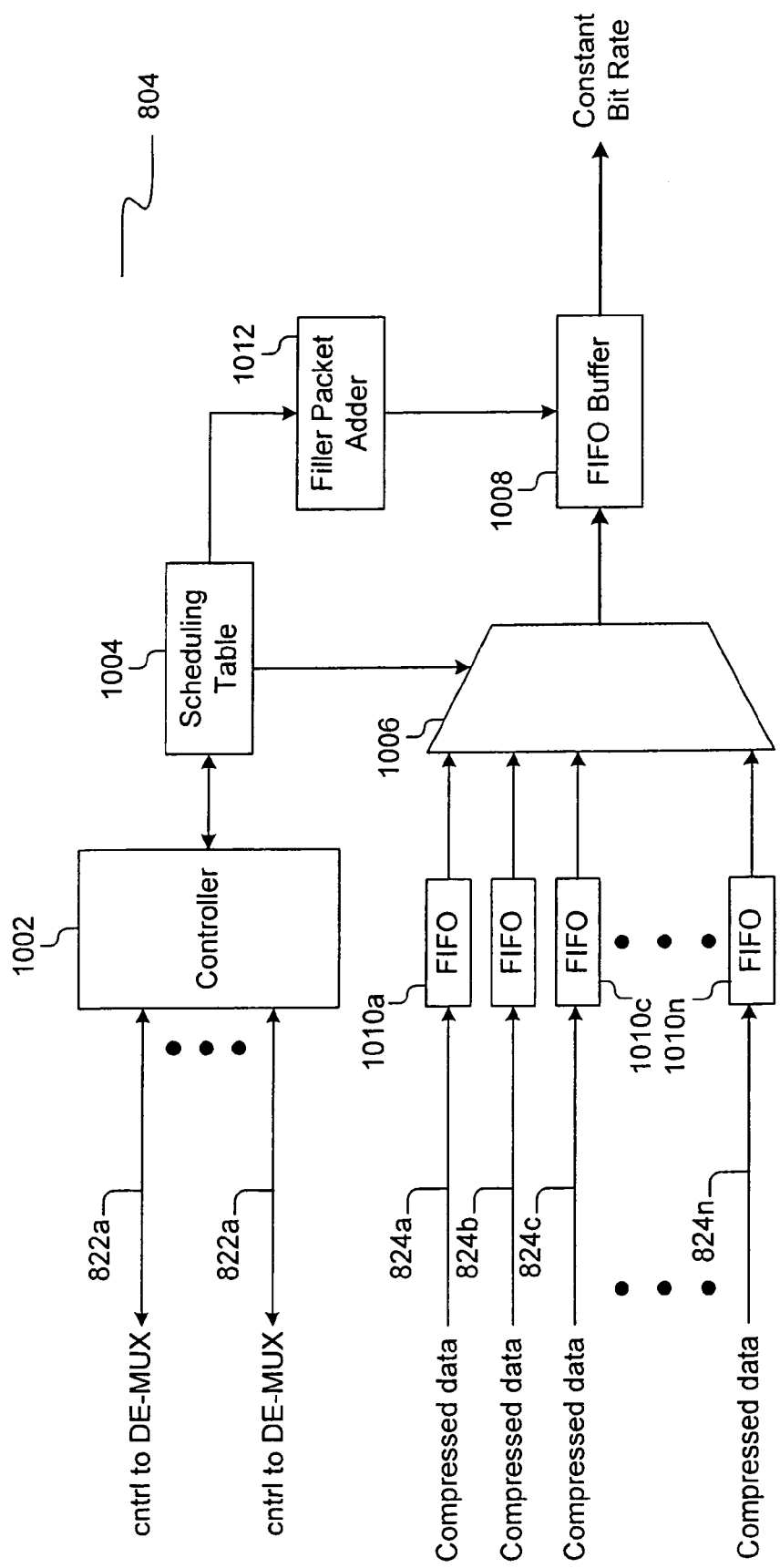
FIG. 10 is a block diagram of a preferred embodiment for a scheduler & multiplexer constructed according to the present invention.

Referring now to FIG. 10, a preferred embodiment for the scheduler & multiplexer 804 is shown. The scheduler & multiplexer 804 preferably comprises a controller 1002, a scheduling table 1004, a multiplexer 1006, a FIFO buffer 1008, a plurality of input FIFO buffers 1010a-n, and a filler packet adder or inserter 1012. The controller 1002 is coupled to control each of the re-multiplexers 802a-n by signal lines 822a-n. Each of the input signal lines 824a-824n is coupled to the input of a respective input FIFO buffer 1010a-n. The input FIFO buffers 1010a-n store the data from the re-multiplexers 802a-n temporarily until it can be scheduled for output through the multiplexer 1006. The input FIFO buffers 1010a-n are first-in, first-out buffers of a conventional type. The controller 1002 is also coupled to the scheduling table 1004. The scheduling table 1004 provides priority data indicating what streams or programs have priority and the amount of bandwidth of the transport channel at each priority level. The scheduling table 1004 is also controls the multiplexer in response to signals from the controller 1002. The scheduling table 1004 in one embodiment uses a single table. In yet another embodiment, the scheduling table 1004 is a plurality of fixed size tables that can be alternatively used. With such a configuration, one table may be used for scheduling while another is being modified. The controller 1002 receives and uses input from the scheduling table 1004 to determine the amount of re-encoding necessary for each program and the order for sending the programs over the transport medium 506 to meet the constraints noted above. The scheduling table 1004 has control outputs coupled to the multiplexer 1006 and the FIFO buffer 1008 via the filler packet inserter 1012. The scheduling table 1004 generates control signals to multiplexer 1006. The multiplexer 1006 pulls the data from the particular FIFO 1010a-n according to the command from the scheduling table 1004, and sends the data to the input of the FIFO buffer 1008. The FIFO buffer 1008 is clocked at a given constant bit rate which meets the capacity of channel 506. The FIFO buffer 1005 allows the re-multiplexed inputs to be mixed, ordered and sent in various ways simply by varying the order in which the respective streams are stored in the FIFO buffer 1008. The scheduling table 1004 is also coupled to the filler packet inserter 1012, and the filler packet inserter 1012, is in turn coupled to an input of the FIFO buffer 1008. Since the scheduler & multiplexer 804 outputs data at a constant bit rate equal to the bandwidth of the transport medium 506, the filler packet inserter 1012 is used to add null packets for the times when the compressed on line 824a-n are insufficient to maintain the constant bit rate. Since the scheduling table 1004 knows the amount of data in the FIFO buffer 1008 at any given time, it can activate the filler packet inserter 1012 as necessary to insert extra place holder packets. The extra place holder packets may be null packets or packets containing stuffing bytes. In an alternate embodiment, the filler packet inserter 1012 could also insert user defined program identification numbers (PIDs) an user information or that could be used by the cab transport plant later down stream.

Figure 12:
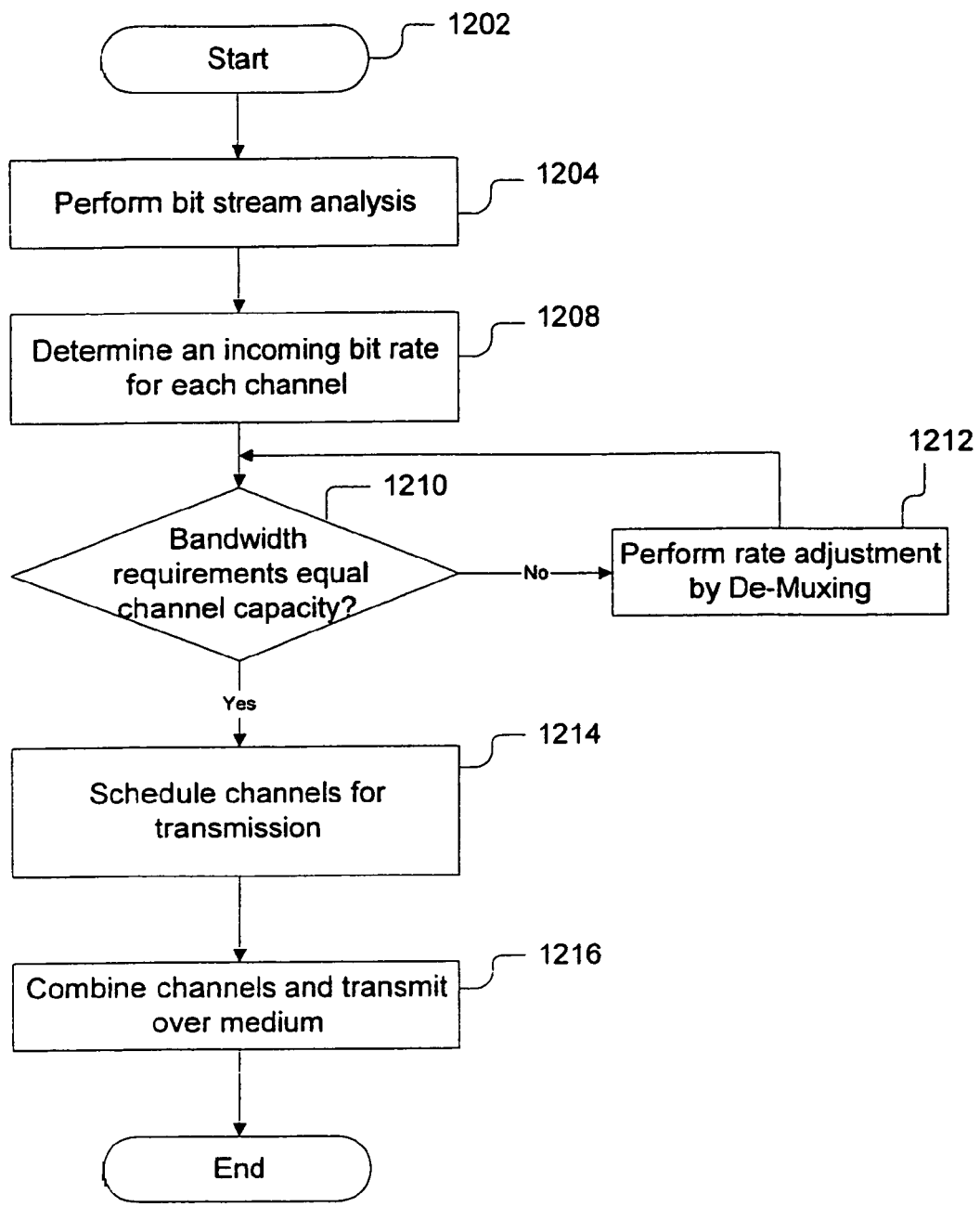
FIG. 12 is a flow chart of a first and preferred method for performing statistical multiplexing according to the present invention.

Referring now to FIG. 12, the operation of the statistical re-multiplexer 504, in particular, the controller 1002 will better be understood. The statistical re-multiplexer 504 and its constituent components perform the steps to ensure that the bandwidth of the transport medium 506 is fully utilized. The process has four basic steps including: (1) performing bit stream analysis; (2) determining a sending rate for each channel; (3) performing rate adjustment; d (4) scheduling the channels for transmission.

Figure 11:
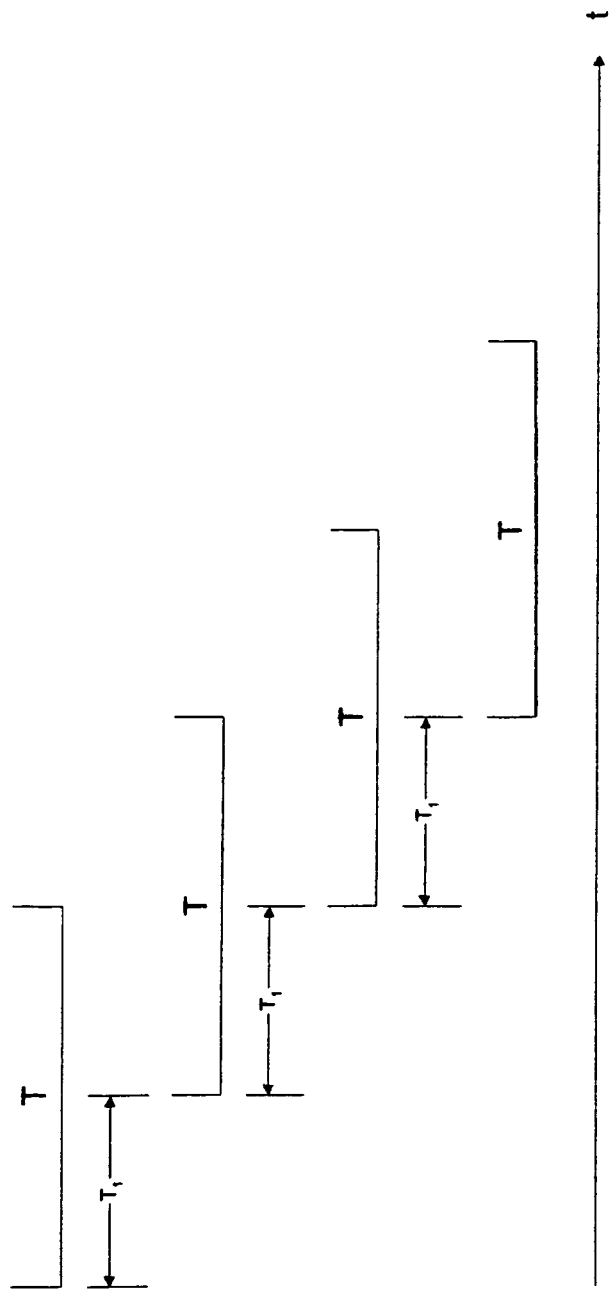
FIG. 11 is a block diagram and time line showing the look ahead sliding window technique for bit analysis of the present invention.

The process begins with step 1204 by performing bit stream analysis. In order to determine at what rate each channel must be sent, the statistical re-multiplexer 504 analyzes the bit streams ahead of time, by adopting look-ahead windowing technique. The term "look-ahead window refers to that the statistical re-multiplexer 504 parses the bit streams to determine the bit usage of each of the channels for $T_1$ seconds ahead of what is currently to be sent, in order to decide the incoming and outgoing bit rate for each channel. Referring also to FIG. 11, a graphic representation of this process is shown. Having made an examination, the statistical re-multiplexer 504 may decide to send out number of bits corresponding to a time $T_1$ for each of the channels, where $T_1$ may be less than or equal to T. For the case $T_1<T$, the statistical re-multiplexer 504 examines the input bit streams from all different programs in an interval T, and only sends out $T_1$ part of the data. In the next iteration, the statistical re-multiplexer 504 examines the data after $T_1$ and the examining data period still uses a time window size of T. This scheme is referred to as a sliding window technique. A typical choice for $T_1$ would be T/2. This also means buffering of data up to T seconds would be required, and a variable time period T with a fixed mean value is a good and unique approach to analyzing the bit stream. The process continues in step 1208, where the method determines an incoming bit rate for each channel, the incoming bit rate is max((bits_in_T/T), (bits_in_$T_1$/$T_1$)).

Next in step 1210, the method tests whether the combined bandwidth requirement of all the channels is equal to the channel capacity. This is tested by comparing the total bandwidth requirements of all the channels to the channel capacity over the time window under consideration. If the combined bandwidth requirement of all the channels is equal to the channel capacity, the method proceeds directly to step 1214. In step 1214, the statistical re-multiplexer 504 schedules all the data for all the channels into a set of schedule tables that give the guidelines for what time and what PID of data will be sent out.

On the other hand, if the combined bandwidth requirements of all the channels do not equal the channel capacity, then the method continues in step 1212 to perform rate adjustment by re-multiplexing. In the case where the bandwidth requirements exceed the channel capacity, then the statistical re-multiplexer 504 decreases the sending rates for channels whose rate must be greater than the minimum rate needed to avoid under flow. The choice of which channel to reduce the sending rate is based on the difference between the current transmission rate and the minimum rate which will guarantee this channel not under flow. It is preferred to reduce the rate of a channel whose rate difference is higher than others. Having attempted to do that for all the channels if the bandwidth requirements are still not met (i.e., the total transmission rate still exceeds the channel capacity), the statistical re-multiplexer 504 then performs rate reduction on selected channels in order to meet the channel requirements.

When the sending rate cannot be further decreased for any of the channels by the statistical multiplexer 504 without under flowing at least one decoder buffer, the statistical re-multiplexer 504 performs rate reduction on some or all of the channels in step 1212. As for the uncompressed data case, it is even easier, the statistical re-multiplexer 504 just communicates with the encoder and demands the proper bit rate from the encoder. Again on each channel that is rate converted some or all of the frames in the window under consideration may be rate converted. The decision as to which channel to be rate converted and how much to be reduced depends on the statistics from each video channel such as the complexity measurement, the picture type, the picture size, GOP size, and etc, and it also depends on the QOS service parameter user entered. The preventive rate reduction is also adopted to ensure the flexibility of choosing a particular channel, which does not affect the visual result adversely. Having parsed the bit stream for each of the channels for T seconds ahead, the statistical multiplexer 504 uses the information obtained, to determine how much rate conversion to perform. Pictures with smaller complexity by a certain measurement can undergo a larger percentage of rate reduction with a smaller loss in picture quality. In general, rates can be reduced on B-frames with lesser impact on overall picture quality, and pictures, which occur later in the Group of Pictures (GOP), can be rate reduced to a larger extent with a smaller impact on picture quality compared to pictures earlier in the GOP. When the degree of the rate reduction is so significant that the conventional rate reduction method cannot achieve that reduction rate, selective B frames will be dropped, and the previous frame will be repeated to replace the dropped B frame to make sure the program interval does not change.

In case the bandwidth requirements are less than the channel capacity the statistical re-multiplexer 504 then increases the sending rate for those channels whose rate is below the maximum rate. If all the sending rates for all channels are at the maximum rate yet the total sending rate is still below the channel capacity, a null packet or filler data is inserted until the total bandwidth equals the channel capacity. An increase in sending rate is achieved by expanding or contracting the time window under consideration for each channel on an individual basis. By sending the same amount of bits in a smaller time window or sending more bits in the same time window achieves the effect of increasing the sending rate. A decrease in sending rate is achieved by expanding or contracting the time window under consideration for each channel on an individual basis. In other words, by sending the same amount of bits in a bigger time window or sending lesser bits in the same time window achieves the effect of decreasing the sending rate. After performing step 1212, the method returns to step 1210 to determine whether the bandwidth requirements no match the channel capacity.

In step 1214, the method schedules the programs or channels for delivery. Once the sending rates for each of the channels have been determined in step 1208, the statistical multiplexer 504 schedules the individual packets of each of the channels. The packets are scheduled such that the entries in the scheduling table are evenly distributed across the different channels. The number of packets to be scheduled for each channel is determined by the rate for that channel, total bandwidth, and the size of the schedule table. It is computed using the equation:

PacketPerTable($I$)=(ScheduleTableSize*Rate($i$))/(TotalBandwidth)

Once the number of packets to be allocated has been computed, the statistical re-multiplexer 504 schedules the individual packets for each channel. Any slots in the schedule table that are not assigned to any of the channels are filled with user controllable filler packets that could be null packets in default, or the opportunity data packets. The same method can also be used to schedule non-video packets. Once the packets have been scheduled, the packets for the programs are combined and transmitted over the medium in step 1216.

Figure 13A:
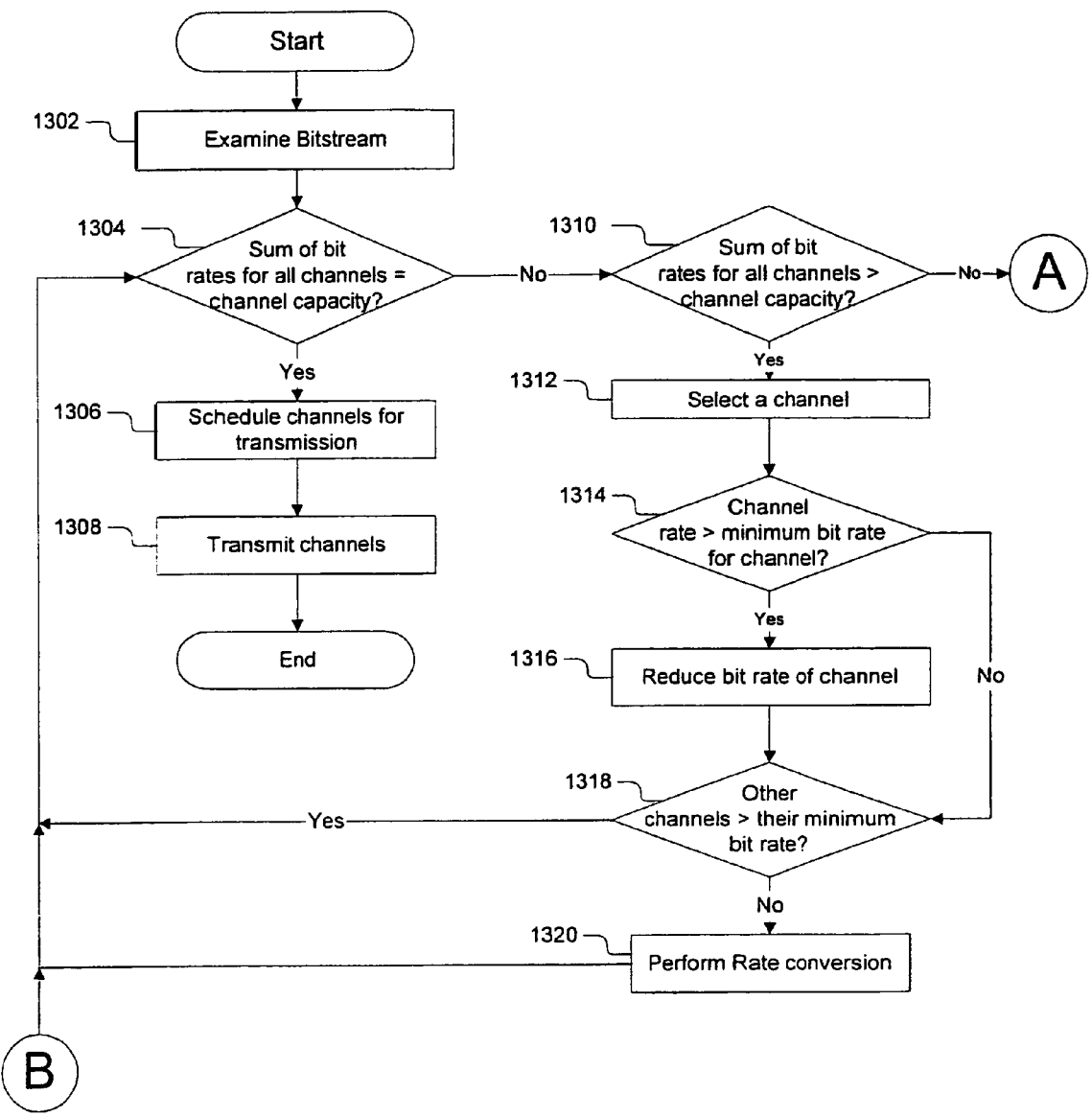
FIGS. 13A and 13B are a flow chart of a second embodiment of the method for performing statistical multiplexing according to the present invention.
Figure 13B:
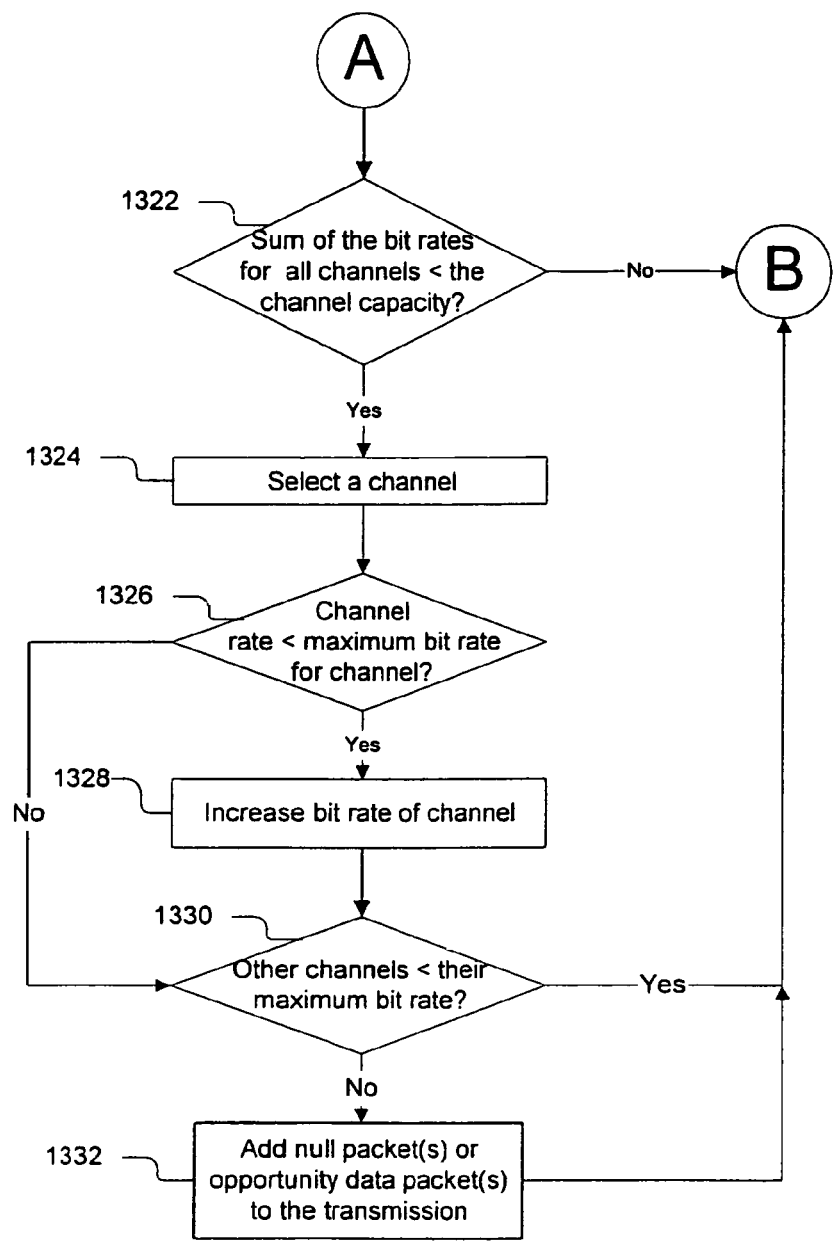

Referring now to FIGS. 13A and 13B, a second embodiment of the method for performing statistical multiplexing according to the present invention. The method begins in step 1302 by examining the bit stream. Next in step 1304, the method tests whether the sum of the bit rates for all channels is equal to the channel capacity. If so, the method continues in step 1306, to schedule the channel for transmission as described above, and then transmits the channels over in step 1308.

If the sum of the bit rates for all channels is not equal to the channel capacity, the method transitions from step 1304 to step 1310. In step 1310, the method determines whether the sum of the bit rates for all channels exceeds the channel capacity. If so, the method continues in step 1312 to select a channel, and in step 1314 the method tests whether the channel rate is greater than the minimum bit rate for the channel.

If the channel rate is greater than the minimum bit rate for the channel, then the method performs step 1316 before continuing to step 1318. In step 1316, the method reduces the bit rate for the selected channel to the minimum bit rate for the channel. If the channel, rate is not greater than the minimum bit rate for the channel, then the method moves directly to step 1318. In step 1318, the method tests whether there are other channels with channel rates greater than their respective minimum bit rates. If so, the method loops back to step 1304 to reduce the bit rates of those channels. If not, the method continues to step 1320 to perform rate conversion on the selected channel. After step 1320, the method moves to step 1304 to determine if the channels are ready for transmission or require additional bit rate reduction.

If the sum of the bit rates for all channels is not greater than the channel capacity, the method moves to step 1322 of FIG. 13B. In step 1322, the method determines whether the sum of the bit rates for all channels is less than the channel capacity. If so, the method continues in step 1324 to select a channel, and in step 1314 the method tests whether the channel rate is less than the maximum bit rate for the channel. If the channel rate is less than the maximum bit rate for the channel, then the method performs step 1328 before continuing to step 1330. In step 1328, the method increases the bit rate for the selected channel to the maximum bit rate for the channel. If the channel rate is not less than the maximum bit rate for the channel, then the method moves directly to step 1330. In step 1330, the method tests whether there are other channels with channel rates less than their respective maximum bit rates. If so, the method loops back to step 1304 to increase the bit rates of those channels. If not, the method continues to step 1332 to add null packets or opportunity data packets on the selected channel. After step 1332, the method moves to step 1304 to determine if the channels are ready for transmission or require additional bit rate reduction.

While the present invention has been described with reference to certain preferred embodiments, those skilled in the art will recognize that various modifications may be provided. These and other variations upon and modifications to the preferred embodiments are provided for by the present invention, which is limited only by the following claims.

What is claimed is:

1. A device for processing video data comprising:
a multiplexer, the multiplexer is configured to
examine a plurality of channels of bit streams each having a bit rate;
determine whether the sum of the bits rates for the plurality of channels is greater than a channel capacity; and
if the sum of the bits rates for the plurality of channels is greater than the channel capacity, then determine whether a selected channel has a bit rate greater than a minimum bit rate for the selected channel and reducing the bit rate by re-encoding for the selected channel if it is determined that the selected channel has a bit rate greater than a minimum bit rate for the channel,
wherein at least one of the plurality of channels of bit streams is a data stream that is not re-encoded.

2. The device of claim 1, wherein the multiplexer is further configured to
determine whether a sum of the bits rates for the plurality of channels is equal to the channel capacity; and
if the sum of the bits rates for the plurality of channels is equal to the channel capacity, schedule data for the plurality of channels for transmission, and transmit data for the plurality of channels.

3. The device of claim 1, wherein the multiplexer is further configured to select packets for transmission from the plurality of channels based on the channel bandwidth, and the respective rates of the plurality of channels.

4. The device of claim 3, wherein the multiplexer is configured to select packets for transmission by selecting a number of packets from each channel according to the following equation:

PacketPerTable($I$)=(ScheduleTableSize*Rate($i$)(Total-Bandwidth).

5. A device for processing video data comprising:
means for examining a plurality of channels of bit streams each having a bit rate; means for determining whether the sum of the bits rates for the plurality of channels is greater than a channel capacity; and
means for, if the sum of the bits rates for the plurality of channels is greater than the channel capacity, then determining whether a selected channel has a bit rate greater than a minimum bit rate for the selected channel and reducing the bit rate by re-encoding for the selected channel if it is determined that the selected channel has a bit rate greater than a minimum bit rate for the channel,
wherein at least one of the plurality of channels of bit streams is a data stream that is not re-encoded.

6. The device of claim 5, further comprising means for determining whether a sum of the bits rates for the plurality of channels is equal to the channel capacity; and
means for, if the sum of the bits rates for the plurality of channels is equal to the channel capacity, scheduling data for the plurality of channels for transmission and transmitting data for the plurality of channels.

7. The device of claim 5, wherein means for scheduling data for the plurality of channels for transmission includes means for selecting packets for transmission from the plurality of channels based on the channel bandwidth, and the respective rates of the plurality of channels.

8. The device of claim 7, wherein selecting packets for transmission is performed by selecting a number of packets from each channel according to the following equation:

PacketPerTable($I$)=(ScheduleTableSize*Rate($i$)(Total-Bandwidth).

9. A device for processing video data comprising:
a multiplexer, the multiplexer is configured to
perform bit stream analysis;
determine an incoming bit rate for each channel;
determine whether the combined bandwidth requirement of all the channels exceeds the channel capacity;
perform rate adjustment by re-multiplexing the channels if the combined bandwidth requirement of all the channels does not equal the channel capacity;
schedule the channels for transmission; and
combine the channels and transmitting the combined channels over a transport medium.

10. The device of claim 9, wherein performing bit stream analysis is performed for a sliding window of time having duration time T, and wherein combining the channels and transmitting the combined channels is for a time T, for each of the channels, where time T, is less than or equal to T.

11. The device of claim 9, wherein the multiplexer is further configured to insert extra packets, and combining and transmitting includes adding and transmitting the inserted extra packets.

12. The device of claim 11, wherein the extra packets include user specified useful packets that contain user defined program identification (PID) information.

13. The device of claim 9, wherein the multiplexer is further configured to a) re-code a selected channel, b) removing stuffing bytes, and c) removing user-defined un-useful packets, and the step of combining and transmitting includes combining and transmitting the re-coded channel.

14. A method of processing video data, comprising:
examining a plurality of channels of bit streams each having a bit rate;
determining whether the sum of the bits rates for the plurality of channels is greater than a channel capacity; and
if the sum of the bits rates for the plurality of channels is greater than the channel capacity, determining whether a selected channel has a bit rate greater than t a minimum bit rate for the selected channel and reducing the bit rate by re-encoding for the selected channel if it is determined that the selected channel has a bit rate greater than a minimum bit rate for the channel,
wherein at least one of the plurality of channels of bit streams is a data stream that is not re-encoded.

15. The method as recited in claim 14, further comprising:
determining whether a sum of the bits rates for the plurality of channels is equal to the channel capacity; and
if the sum of the bits rates for the plurality of channels is equal to the channel capacity, scheduling data for the plurality of channels for transmission, and transmitting data for the plurality of channels.

16. The method as recited in claim 14, further comprising:
selecting packets for transmission from the plurality of channels based on the channel bandwidth, and the respective rates of the plurality of channels.

* * * * *

UNITED STATES PATENT AND TRADEMARK OFFICE
CERTIFICATE OF CORRECTION

PATENT NO. : 7,593,433 B1  Page 1 of 1
APPLICATION NO. : 11/074554
DATED : September 22, 2009
INVENTOR(S) : Wu et al.

It is certified that error appears in the above-identified patent and that said Letters Patent is hereby corrected as shown below:

On the Title Page insert item:

1. Include the following information at the end of the section entitled "Related U.S. Application Data":

--(60)  Provisional application No. 60/122,451, filed on March 2, 1999.--

Signed and Sealed this

Eighteenth Day of May, 2010

David J. Kappos
*Director of the United States Patent and Trademark Office*